W. C. FALK.
AUTOMOBILE TRANSMISSION GEARING.
APPLICATION FILED FEB. 3, 1910.
958,242.
Patented May 17, 1910.
2 SHEETS—SHEET 2.
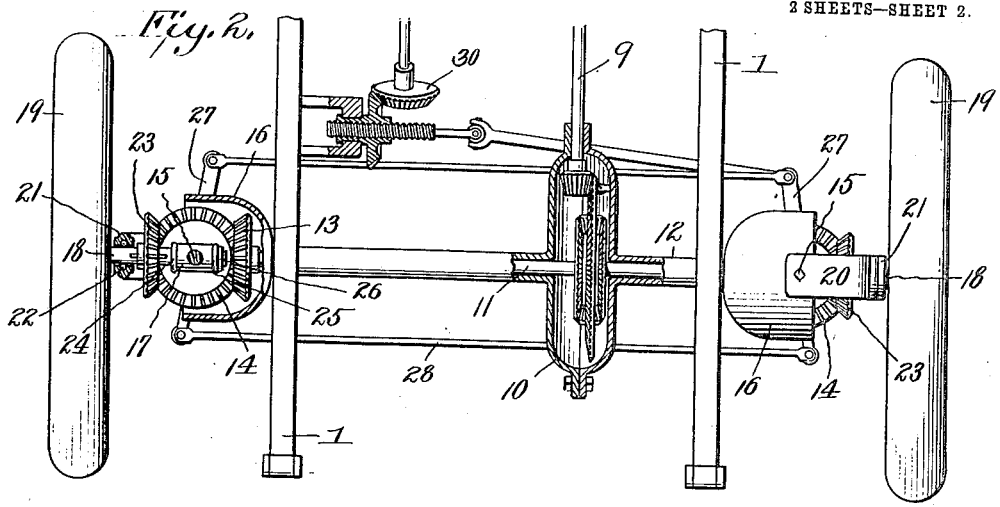
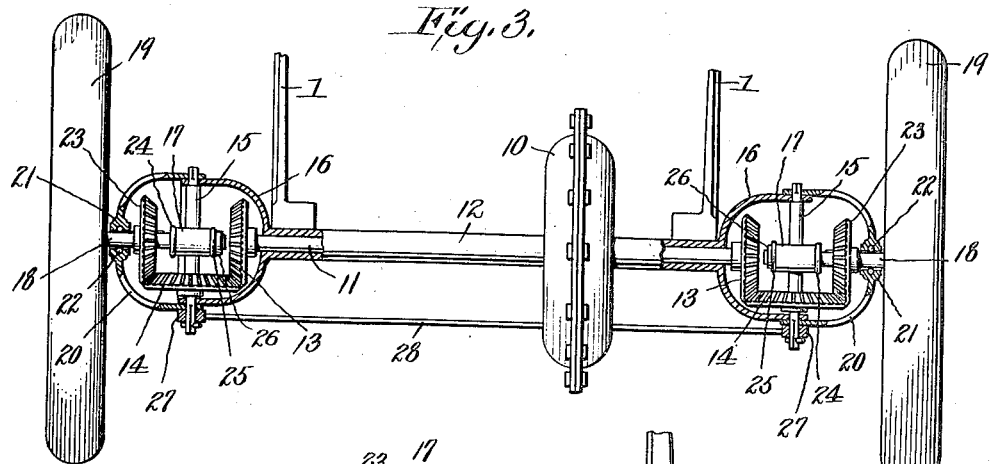
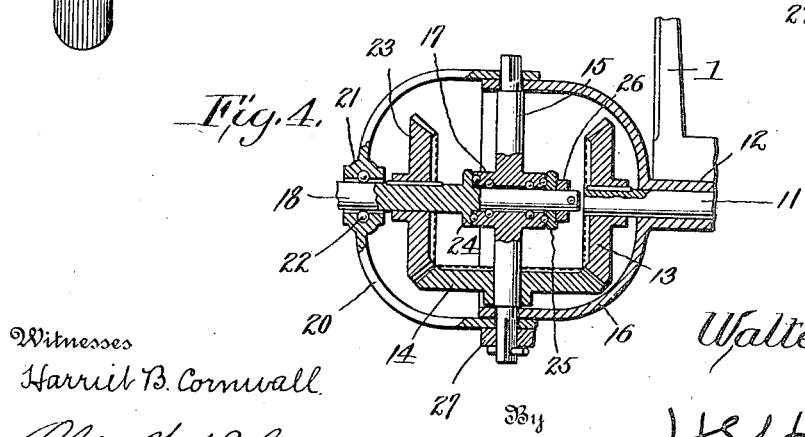
Witnesses
Harriet B. Cornwall
Oliver W. Holmes
Inventor
Walter C. Falk
By
J. S. Hill
Attorney

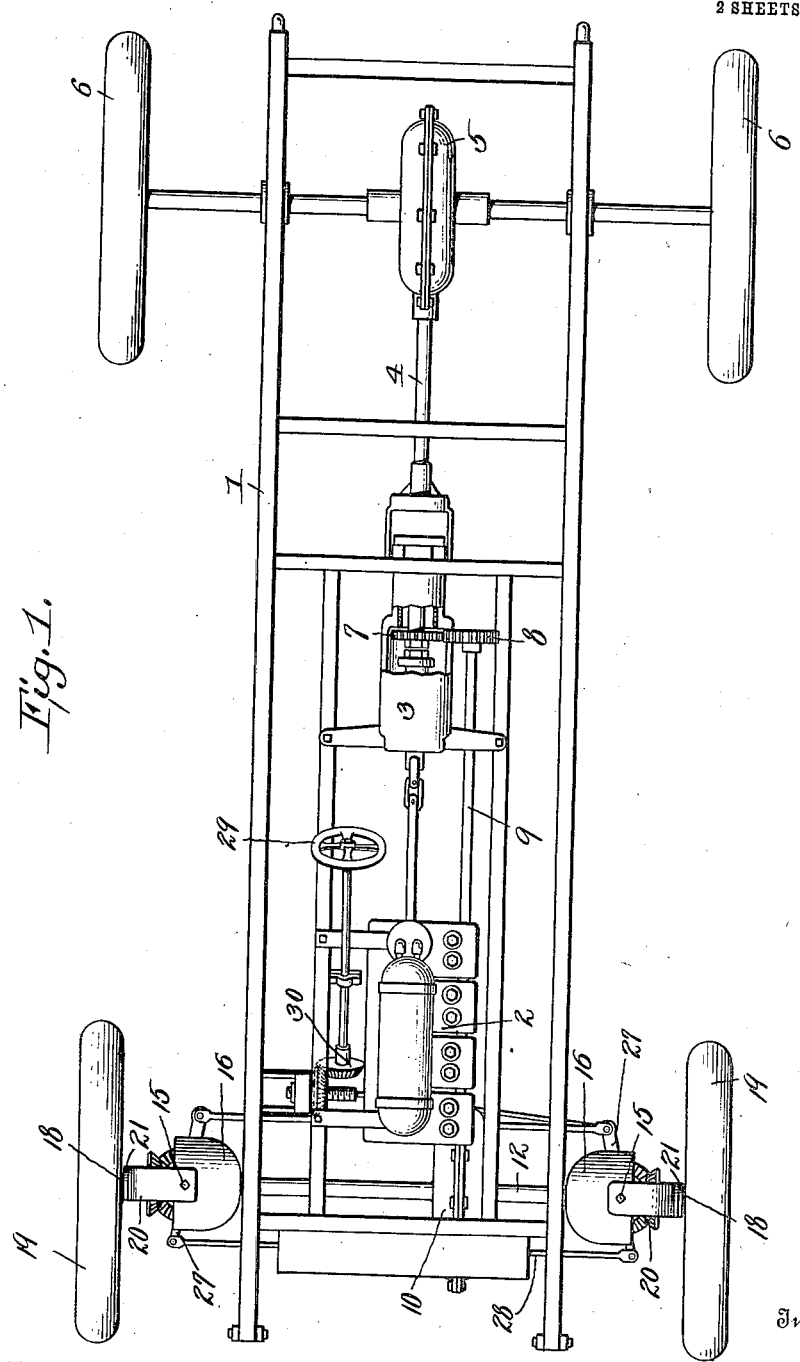

UNITED STATES PATENT OFFICE.

WALTER C. FALK, OF BLUFFTON, INDIANA.

AUTOMOBILE TRANSMISSION-GEARING.

958,242. Specification of Letters Patent. Patented May 17, 1910.

Application filed February 3, 1910. Serial No. 541,741.

*To all whom it may concern:*

Be it known that I, WALTER C. FALK, citizen of the United States, residing at Bluffton, in the county of Wells and State of Indiana, have invented certain new and useful Improvements in Automobile Transmission-Gearings, of which the following is a specification.

The present invention relates in general to motor vehicles, and more particularly to novel means for transmitting power to the front wheels of the vehicle as well as to the rear wheels, thereby increasing the road adhesion of the machine and enabling a much larger portion of the power of the engine to be utilized when starting the machine or running at a low speed.

The object of the invention is the provision of a motor vehicle in which power is transmitted to all four of the wheels, the said motor vehicle being simple and inexpensive in its construction, reliable in operation, and being so designed as not to interfere in any manner with the steering mechanism.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings in which—

Figure 1 is a top plan view of the running gear of an automobile constructed in accordance with the present invention. Fig. 2 is a top plan view of the forward end of the automobile, parts being shown in section. Fig. 3 is a front elevation of the automobile, parts being broken away and shown in section, and Fig. 4 is an enlarged vertical sectional view through the gearing which is provided at each end of the front axle.

Corresponding and like parts are referred to in the following description and indicated in all the views of the drawing by the same reference characters.

Referring to the drawings, the numeral 1 designates the main frame of the vehicle, an engine 2 of any suitable construction being mounted upon the forward portion of the frame so as to transmit motion to the usual transmission gearing 3 which is shown as mounted upon the central portion of the frame. From this transmission gearing power is conveyed in any conventional manner as by means of the shaft 4 and differential gearing 5 to the rear axle which has the rear wheels 6 rigidly applied thereto. One of the gear wheels 7 of the transmision gearing 3 also meshes with a gear wheel 8 at the rear end of a forwardly extending shaft 9 which is journaled upon the frame of the vehicle and is shown as passing under the engine, the forward end of the shaft transmitting power through the usual differential gearing 10 to the front axle 11. This front axle is journaled in suitable bearings 12 upon the main frame 1 and is provided at each end with a vertically disposed bevel gear wheel 13. Each of these bevel gear wheels 13 meshes with a horizontally disposed beveled gear wheel 14 which acts as an idler and is loosely mounted upon a vertical shaft 15 which passes through openings in a casing 16 projecting from the bearing 12. This casing 16 is either integral or rigidly connected to the said bearing 12 and the vertical shaft 15 turns freely therein about its axis.

The middle portion of each of the vertical shafts 15 is enlarged to form a horizontally disposed cylindrical bearing 17 in which the inner end of a stub axle 18 is journaled, the outer end of the said stub axle having one of the front wheels 19 keyed upon or otherwise rigidly applied thereto. The extremities of each of the vertical shafts 15 have an angular formation and project both above and below the casing 16, the ends of a yoke 20 being fitted over the said angular ends of the shaft so that the yoke and shaft are rigid with each other and turn in unison. The middle portion of the yoke 20 is formed with a bearing 21 which is spaced from and in alinement with the cylindrical bearing 17 and within which the stub axle 18 is also journaled.

As shown on the drawings, the bearings for the stub axle are provided with the usual antifriction rollers 22 to reduce the friction and prevent binding of the parts. Keyed upon each of the stub axles 18 or otherwise rigidly applied thereto between the bearing 21 of the yoke and the cylindrical bearing 17 of the vertical shaft 15 is a vertically disposed beveled gear wheel 23 which meshes with the teeth of the idler 14. It will thus be obvious that when the front axle 11 is rotated motion will also be transmitted to the stub axles 18 through the medium of the beveled gear wheels 13, 14 and 23. Each of the stub axles 18 is formed with a collar 24 which engages the outer end of the cylindrical bearing 17 and has a ring 25 applied thereto which engages the inner end of the cylindrical bearing, the said ring 25 being removable and being normally held in position by any suitable means such as the key 26. In this manner the stub axles are securely held against longitudinal movement, and owing to the fact that the bearings 17 and 21 are spaced from each other, the stub axles will be held securely against any upward swinging movement. The lower end of each of the vertical shafts 15 also has a steering lever 27 fitted thereon, the two steering levers projecting both forwardly and rearwardly from the vertical shafts and having their corresponding extremities connected in the usual manner by means of the links 28. Connection with a steering wheel 29 may be made through the medium of any conventional form of gearing such as that indicated at 30 so that the front wheels may be turned about a vertical axis and the machine guided in the usual manner.

From the foregoing description, it will be obvious that I have provided a very simple and effective means for transmitting power to the front wheels of a motor vehicle without interfering in any manner with the steering mechanism for guiding the machine.

Having thus described the invention, what I claim as new and desire to secure by Letters Patent is:

1. In a motor vehicle, the combination of a main frame, an engine mounted upon the main frame, an axle journaled upon the main frame, means for transmitting power from the engine to the axle, a casing carried by the main frame adjacent each end of the axle, a vertical shaft loosely mounted upon each of the said casings, the said vertical shafts being provided with horizontally disposed bearings, a yoke fitted to each of the vertical shafts so as to rotate therewith and formed with a bearing arranged in alinement with the bearing of the said vertical shaft, stub axles journaled within the bearings of the yokes and vertical shafts, wheels rigid with the stub axles, means for transmitting motion from the before mentioned axle to the stub axles, and means for turning the vertical shafts to swing the wheels about a vertical axis.

2. In a motor vehicle, the combination of a main frame, an engine mounted upon the main frame, an axle journaled upon the main frame and provided at each end with a gear wheel, means for transmitting motion from the engine to the axle, a casing carried by the main frame adjacent each end of the axle, a vertical shaft rotatably mounted upon each of the casings and formed at a point between its end with a horizontally disposed bearing, a yoke applied to each of the vertical shafts so as to rotate therewith, the ends of the yoke being secured to the ends of the vertical shaft while the middle portion of the yoke is formed with a bearing which is arranged in alinement with the bearing of the vertical shaft, stub axles journaled within the bearings of the yokes and the said vertical shafts, wheels rigidly applied to the stub axles, gear wheels loose upon the vertical shafts and meshing with the before mentioned gear wheels of the axle, gear wheels keyed upon the stub axles and meshing with the said gear wheels loose upon the vertical shafts, and means for turning the vertical shafts to swing the wheels about a vertical axis.

In testimony whereof I affix my signature in presence of two witnesses.

WALTER C. FALK.

Witnesses:
 JOHN K. RINEHART,
 CHAS. G. DAILEY.